Sept. 2, 1941.   H. HARGREAVES   2,255,008
BRACELET
Filed June 14, 1940
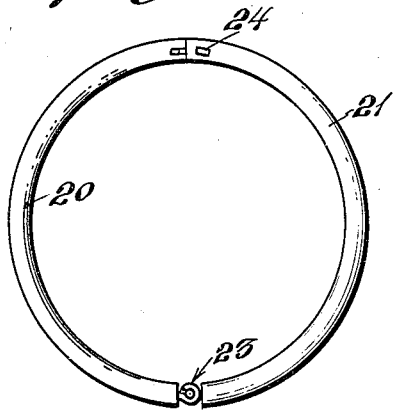
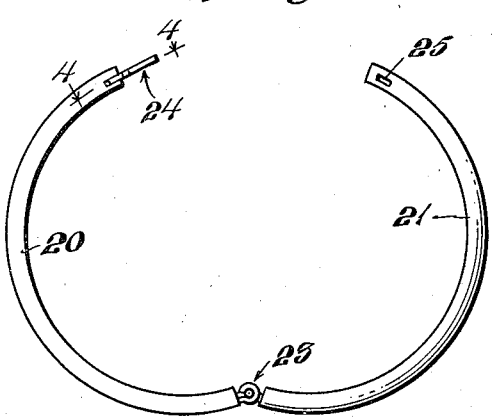
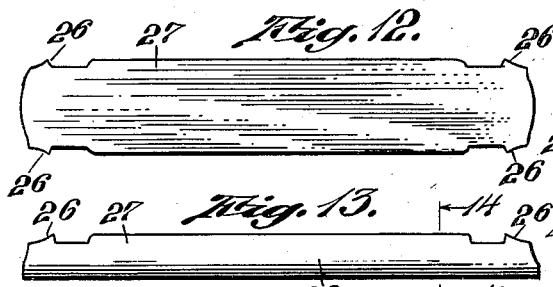
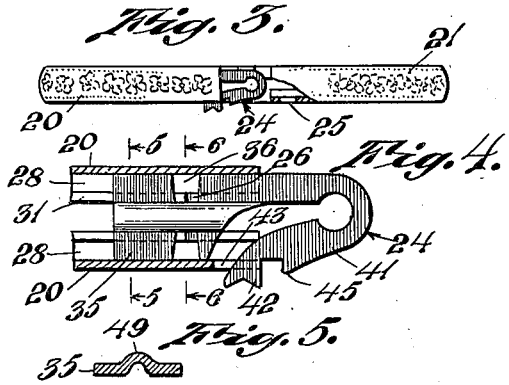
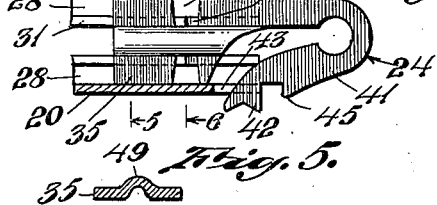
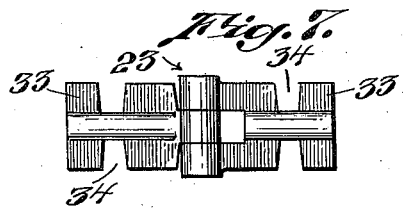
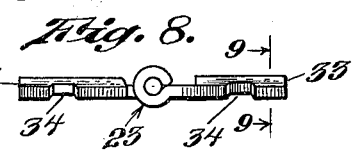
INVENTOR.
Henry Hargreaves
BY Barlow & Barlow
ATTORNEYS.

Patented Sept. 2, 1941

2,255,008

UNITED STATES PATENT OFFICE 2,255,008

BRACELET

Henry Hargreaves, Providence, R. I., assignor to L. S. Peterson Company, North Attleboro, Mass., a partnership composed of Henry A. Peterson and Lester S. Peterson Application June 14, 1940, Serial No. 340,509

5 Claims. (Cl. 63—7)

This invention relates to bracelets composed of arcuate sections, and has for one of its objects to provide simple and inexpensive means for fixedly securing the hinge member and the catch member to the ends of the bracelet sections.

Another object of the invention is to provide a bracelet structure which is formed of a plurality of longitudinally curved sections and the attaching and securing thereto of the hinge and the catch elements for connecting and holding the ends of the bracelet section together providing an interlocking relation of the bracelet part with said holding elements.

Another object of the invention is the attachment and anchoring of the hinge member and the catch member to the bracelet sections without the use of solder, welding or the like.

With these and other objects in view, the invention consists of certain novel features of construction, as will be more fully described, and particularly pointed out in the appended claims.

In the accompanying drawing:

Fig. 1 is a side elevational view of a bracelet embodying the invention, the bracelet sections being closed to form a circular band;

Fig. 2 is a side elevational view of the bracelet shown in Fig. 1, the sections thereof being partly opened on their hinge connection;

Fig. 3 is a top plan view of the bracelet shown in Fig. 1;

Fig. 4 is a fragmentary sectional view taken on the line 4—4 of Fig. 2 showing the catching means and the manner of securely attaching it to one-half section of the bracelet;

Fig. 5 is a cross-sectional view of the catch member, taken on the line 5—5 of Fig. 4;

Fig. 6 is a cross-sectional view taken on the line 6—6 of Fig. 4;

Fig. 7 is a top plan view of a hinge showing the recesses at borders of the hinge plates and the central longitudinal rib thereof for preventing lateral twist relative to the bracelet sections;

Fig. 8 is a side elevational view of the hinge shown in Fig. 7;

Fig. 9 is a cross-sectional view taken on line 9—9 of Fig. 8;

Fig. 10 is a fragmentary elevational view showing the inner side of the hinge connection between the bracelet section and the rolled side edge portions thereof with the hinge in place and securely anchored to and connecting both sections by the spurs on the rolled edge portions having interfitting engagement within the side recesses in the hinge plates;

Fig. 11 is a cross-sectional view taken on the line 11—11 of Fig. 10;

Fig. 12 is a top plan view of a blank as it appears after being struck out of a flat strip of metal, showing the spurs at the sides of the opposite end portions of the bracelet section having interlocking connection with the recessed plate portions of the hinge and the catch member for securing the same to the bracelet section;

Fig. 13 is a side elevational view of the blank shown in Fig. 12 showing the side edge portions bent upwardly from the same surface of the blank;

Fig. 14 is a cross-sectional view, on enlarged scale, taken on the line 14—14 of Fig. 13; and Fig. 15 is a detail fragmentary perspective view, partly in section, showing diagrammatically the interlocking relationship between the spur connection of the bracelet section and the recessed plate member of either the hinge member or the latching member.

It is desirable in the attachment of the hinge member and the catch member, which serve to hold the adjacent ends of a plurality of arcuate bracelet sections together in hinged and separable relation respectively to form a band-like bracelet structure, to provide means whereby the hinge and catch parts can be assembled and be fixedly secured to the curved bracelet sections in an inexpensive manner without the use of solder, welding or the like; and in order that such a structure may be provided I have provided lateral flanges extending longitudinally along and bordering the opposite side edges of each bracelet section, which flanges I have rolled inwardly toward each other on a continuous curve with the edges of the flanges swaged down into firm binding engagement with the side edge portions of the top face of the hinge member and the catch member respectively when such holding parts are positioned between and beneath the flanges at their respective ends of the bracelet sections, and I have further provided the hinge member and the catch member each with recesses into which are received suitable projections, preferably in the form of spurs, although not limited to such pointed shape, which projections are integral with and extend outwardly from the inwardly directed edges of said flanges for fixedly anchoring the hinge and the catch parts to the ends of the associated bracelet section, and means are also provided to prevent lateral twisting of the hinge member and the catch member respectively when such members are located between the lateral flanges; and the following is a more detailed description of the present embodiment of this invention, illustrating the preferred means by which these advantageous results may be accomplished.

With reference to the drawing, 20 and 21 designate the two arcuate half-sections of the bracelet band which sections, when hingedly connected together at one end by means of a hinge member generally designated 23 and with the free end of one section 20 in detachable clasping engagement with the free end of the other section 21 by means of a yieldable catch member generally designated 24 detachably received by a side slot 25 near the free end of the section 21, thereby provide a circular bracelet band of suitable curvature and size to encircle the wrist of the wearer.

The curved sections 20 and 21 are similar in that they are each formed from flat metal sheet stock stamped out therefrom to provide a blank 27 of the general formation as shown in Fig. 12 having the lateral projections or spurs 26 extending outwardly from opposite edges of the longitudinal edge portions of the blank and struck out of the stock at the side marginal borders of the blank. The blanks forming the sections 20 and 21 respectively are similar in that they are each formed from flat metal sheet stock stamped out therefrom to provide a blank 27 of the general formation as shown in Fig. 12 having the lateral projections or spurs 26 extending outwardly from opposite edges of the longitudinal edge portions of the blank and struck out of the stock at the side marginal borders of the blank. The blanks forming the sections 20 and 21 respectively are of similar size and shape and differ from each other only as to the number and location of the spurs 26, in which those in the blank 27 from which the section 20 is formed being provided at both end portions of the blank, as shown in Figs. 12 and 13 for anchoring both the hinge and the clasp members; while in the blank from which the section 21 is formed has the spurs carried at one end portion only for anchoring the hinge connection member.

The longitudinal marginal edge portions 28 of the respective blanks of each section 20 and 21 are then rolled upwardly into U-shaped formation as represented in Figs. 13 and 14, to provide an intermediate product having upright side walls 29, and a bottom wall 30 which forms the outer curved face of the bracelet section.

The side walls 29 thus formed from the marginal edge portions 28 then are rolled inwardly to provide longitudinally extending flanges directed inwardly toward each other on a continuous curve; and the edges 31 of the flanges are swaged down into clamping engagement with the top face of the hinge plates 33 to clamp the hinge member 23 firmly in position in the end portions of the bracelet sections 20 and 21 with the spurs 26 projecting into and retained in interlocking engagement within the space of the recesses 34 extending inwardly from the opposite side edges of the hinge 23, as shown in Figs. 7, 8 and 15.

The yieldable catch member 24 consists of a plate member 35 having one end portion positioned in and similarly secured to the free end of the bracelet section 20 by the spurs 26 projecting outwardly from the inwardly directed edges 31 of the flanged edge portions 28 and extending into the side recesses 36 of the plate 35 wherein they are maintained in interlocking engagement therewith by swaging down of the edges 31 of the side walls 29 into binding engagement with the top face of the plate 35 of the catch member 24 to securely anchor the same in the bracelet section 20.

The forward end portion of the plate 35 of the catch member 24 projects outwardly in advance of the free end of the bracelet section 20 to which it is affixed, as shown in Figs. 2 and 4, and is cut out to provide a tongue 40 for slidable insertion into the channel space between the side flanges of the free end of the bracelet section 21. As illustrated, the tongue 40 is formed with a resilient arm 41 carrying at its free end a laterally projecting finger piece 42 extending outwardly through the side slot 43 at the end of the section 20, and a protuberance 45 adapted to have separable snap connection with the slot 25 in the free end of the bracelet section 21, to hold the sections 20 and 21 clasped together. Whenever release of the clasped relation of the catch 24 is desired this is effected by manually depressing the finger piece 42 inwardly from the side enough to disengage the protuberance 45 from the confines of the slot 25.

The plates 33 of the hinge member 23 and the plate 37 of the catch member 24 are each provided with central longitudinal ribs 48 and 49 respectively which ribs fit in between the rolled portions 28 to securely lock the hinge plates and the catch plate against lateral twisting movement.

The foregoing description is directed solely towards the construction illustrated, but I desire it to be understood that I reserve the privilege of resorting to all the mechanical changes to which the device is susceptible.

I claim:

1. A bracelet structure comprising arcuate sections, longitudinally extending flanges at the marginal side edges of each section with the flanges directed inwardly toward each other on a continuous curve, a hinge member for securely connecting two adjacent ends of said sections together including hinge plates positioned between the flanges with the marginal edge portions of the hinge plates beneath the flanges at the opposite side edges of the associated section and the inwardly directed edges of said flanges in binding engagement with the top faces of the hinge plates, said hinge plates having recessed portions, and projections extending outwardly from the inwardly directed edges of said flanges and received by said recessed portions of said hinge plates for fixedly anchoring the hinge member to the bracelet sections.

2. A bracelet structure comprising arcuate sections, longitudinally extending flanges at the marginal side edges of each section with the flanges directed inwardly toward each other on a continuous curve, a hinge member for securely connecting two adjacent ends of said sections together including hinge plates positioned between the flanges with the marginal edge portions of the hinge plates beneath the flanges at the opposite side edges of the associated section and the inwardly directed edges of said flanges in binding engagement with the top faces of the hinge plates, said hinge plates having recessed portions, and spurs projecting outwardly from the inwardly directed edges of said flanges and received by said recessed portions of said hinge plates for fixedly anchoring the hinge member to the bracelet sections.

3. A bracelet structure comprising arcuate sections, longitudinally extending flanges at the marginal side edges of each section with the flanges directed inwardly toward each other on a continuous curve, a hinge member for securely connecting two adjacent ends of said sections together including hinge plates positioned between the flanges with the marginal edge portions of the hinge plates beneath the flanges at the opposite side edges of the associated section and the inwardly directed edges of said flanges in binding engagement with the top faces of the hinge plates, said hinge plates having recesses extending inwardly from the opposite side edges thereof, and spurs projecting outwardly from the inwardly directed edges of said flanges and received by said recesses of said hinge plates for fixedly anchoring the hinge member to the bracelet sections.

4. A bracelet structure as set forth in claim 1 characterized by a separable catch connection between the free ends of the bracelet sections, said catch comprising a plate member having one end portion positioned between opposite side flanges of a section at its free end with the marginal edge portions of the plate member beneath the flanges and the inwardly directed edges of the flanges in binding engagement with the top face of the plate, said plate having recessed portions, and projections extending outwardly from the inwardly directed edges of said flanges and received by said recessed portions of said plate for fixedly anchoring the same to the bracelet section, the other end of said plate projecting outwardly in advance of the free end of the section to which it is affixed and having separable snap connection with the free end of the other bracelet section.

5. A bracelet structure as set forth in claim 1 characterized by a separable catch connection between the free ends of the bracelet sections, said catch comprising a plate member having one end portion positioned between opposite side flanges of a section at its free end with the marginal edge portions of the plate member beneath the flanges and the inwardly directed edges of the flanges in binding engagement with the top face of the plate, said plate having recessed portions, and spurs projecting outwardly from the inwardly directed edges of said flanges and received by said recessed portions of said plate for fixedly anchoring the same to the bracelet section, the other end of said plate projecting outwardly in advance of the free end of the section to which it is affixed and having separable snap connection with the free end of the other bracelet section.

HENRY HARGREAVES.